United States Patent

Ohuchi

[19]

[11] Patent Number: 5,805,671
[45] Date of Patent: Sep. 8, 1998

[54] AUDIO MESSAGE SERVICE APPARATUS

[75] Inventor: Masatomo Ohuchi, Kawasaki, Japan

[73] Assignee: Canon Kabushiki Kaisha, Tokyo, Japan

[21] Appl. No.: 664,029

[22] Filed: May 24, 1996

Related U.S. Application Data

[63] Continuation of Ser. No. 161,745, Dec. 2, 1993, abandoned.

[30] Foreign Application Priority Data

Dec. 4, 1992 [JP] Japan ................................ 4-350838

[51] Int. Cl.$^6$ .................................................. H04M 1/64
[52] U.S. Cl. .............................. 379/67; 379/114; 379/144
[58] Field of Search ................................. 379/67, 88, 89, 379/131, 140, 142, 144, 69, 114, 115, 121, 130; 381/29, 30, 31, 32, 33, 34, 35; 395/2.1, 2.79

[56] References Cited

U.S. PATENT DOCUMENTS

| | | | |
|---|---|---|---|
| 4,491,953 | 1/1985 | Bellisio | 379/27 |
| 4,602,129 | 7/1986 | Matthews et al. | 379/89 |
| 4,751,728 | 6/1988 | Treat | 379/113 |
| 4,759,056 | 7/1988 | Akiyama | 379/197 |
| 4,791,660 | 12/1988 | Oye | 379/88 |
| 4,885,763 | 12/1989 | O'Brien | 379/67 |
| 4,891,835 | 1/1990 | Leung | 379/88 |
| 4,897,865 | 1/1990 | Canuel | 379/91 |
| 4,916,742 | 4/1990 | Kolesnikov | 381/30 |
| 4,932,048 | 6/1990 | Kenmochi et al. | |
| 5,014,303 | 5/1991 | Velius | 379/201 |
| 5,113,429 | 5/1992 | Morley | 379/88 |
| 5,218,640 | 6/1993 | Morio | 381/30 |
| 5,347,305 | 9/1994 | Bush | 348/14 |
| 5,555,290 | 9/1996 | McLeod et al. | 379/112 |

FOREIGN PATENT DOCUMENTS

| | | | |
|---|---|---|---|
| 0444536A2 | 9/1991 | European Pat. Off. | |
| 2180123 | 3/1987 | United Kingdom | 379/88 |

*Primary Examiner*—Fan S. Tsang
*Attorney, Agent, or Firm*—Morgan & Finnegan LLP

[57] ABSTRACT

An audio message service apparatus comprises a first memory to store an encoded audio message, a second memory to store management data regarding the encoded audio message stored in the first memory and an encoder for again encoding the encoded audio message stored in the first memory by another different encoding method on the basis of the management data stored in the second memory and for storing the audio message which was again encoded into the first memory. The encoder encodes the encoded audio message by an encoding method of a higher compression ratio.

3 Claims, 21 Drawing Sheets

| PROC | TO BE EXECUTED ? | LIMITATION VALUE |
|---|---|---|
| TRANSMISSION LIMITATION | YES | 30 |
| MAIL REGISTRATION LIMITATION | NO | 40 |
| MESSAGE DISPLAY | YES | 10 |
| ALARM SOUND | NO | 10 |
| ENCODING METHOD CHANGE | YES | 24 HRS |
| TRANSMISSION TIME, TRANSMISSION | YES | 20 |
| ABSENCE TIME, TRANSMISSION | YES | 20 |
| | | |
| | | |

PART OF RAM 12

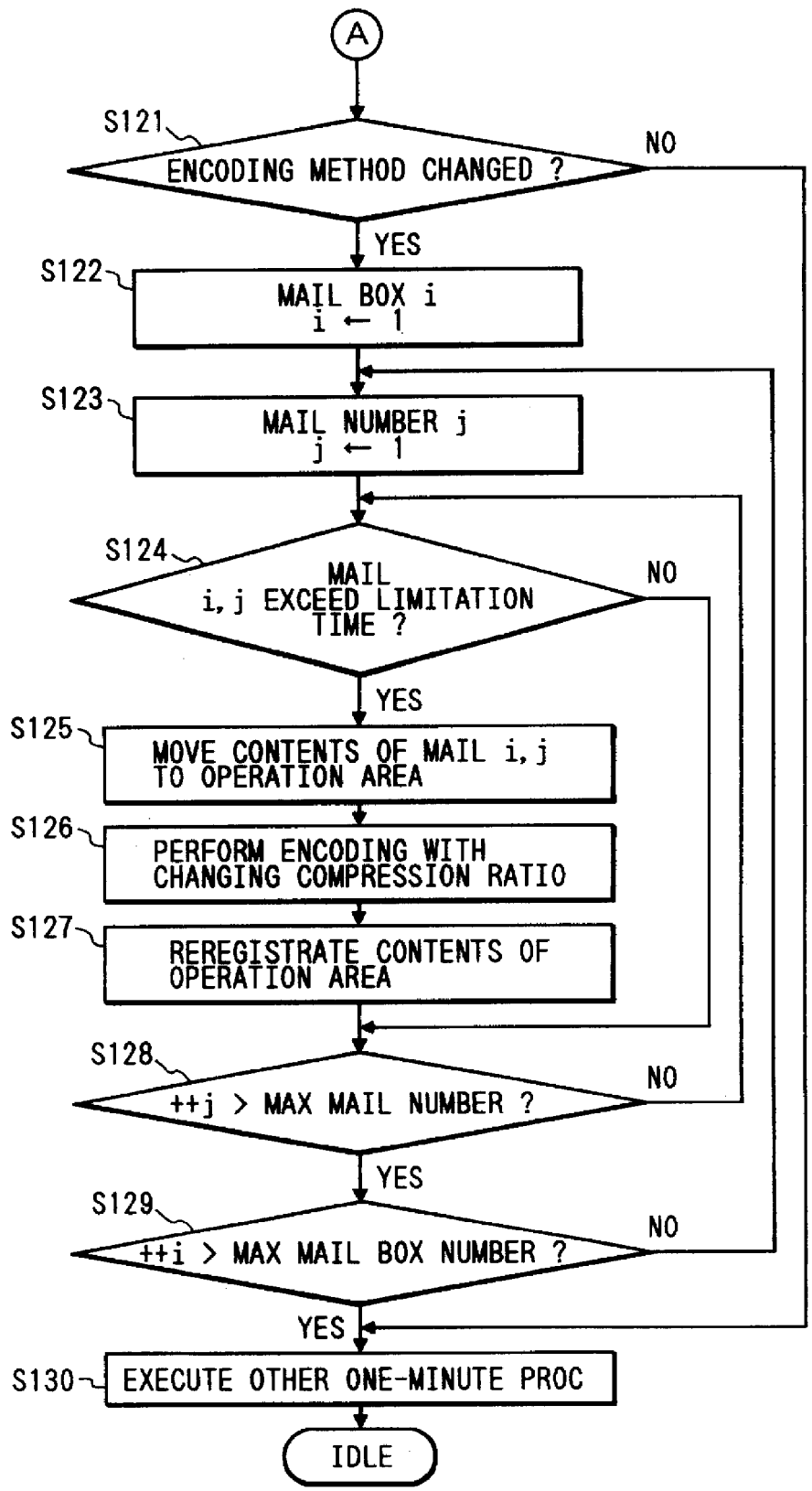

FIG. 18

| MESSAGE ID | TRANSMISSION DATE & TIME | MESSAGE DESTINATION TELEPHONE NUMBER | CONTENTS | TIME (SEC) |
|---|---|---|---|---|
| 1 | 16:10 ON MARCH 3 | 011 - 222 - 3333 | CONFERENCE STARTS FROM 08:00 | 8 |
| 2 | 12:00 ON MARCH 1 | 044 - 555 - 6666 | TELEPHONE NUMBER IS CHANGED | 10 |
| 3 | 08:30 ON MARCH 2 | 0789 - 10 - 2345 | NAME OF SECTION IS CHANGED | 10 |
| . | | | | |
| . | | | | |
| 10 | | | | |

FIG. 19

SPEECH COMMUNICATION TIME AND CHARGE
(FOR EACH TIME)

| | ACCESS NUMBER |
|---|---|
| A | NONE |
| B | 0071 |
| C | 0072 |
| D | 0073 |

(1) GROUND NUMBER 06

CHARGE (YEN) vs SPEECH COMMUNICATION TIME (MIN)

EARLY MORNING & MIDNIGHT

DAYTIME

NIGHT (INCLUDING DAYTIME OF SATURDAY, SUNDAY AND HOLIDAY)

AUDIO MESSAGE SERVICE APPARATUS

This is a continuation of application Ser. No. 08/161,745, filed on Dec. 2, 1993, now abandoned.

BACKGROUND OF THE INVENTION

1. Field of the Invention

The invention relates to an audio message service apparatus for storing an inputted audio message and for transmitting the stored audio message.

2. Related Background Art

In a telephone exchange apparatus having a mail function, mail functions such as memory registration/hearing/deletion, substitute transmission/reception, official report, and the like are realized by using a storing apparatus of a large capacity. For example, there are the following mail functions.

(1) Mail notification

When a mail is registered into a mail box, the mail is notified by the following method.

① the telephone corresponding to the mail box is called.
② the mail corresponding to the mail box is displayed to the telephone.
③ a call is generated to a preset external line or extension and the mail is transferred.
④ a preset pocket bell is called. or the like.

(2) Hearing of a mail

① the mail is reproduced together with the registered data and time.

(3) Mail capacity

① the number of mails which can be registered into the mail box is designated.
② the maximum time of one mail is designated. (4) Method of sound encoding (compression)
① it can be selected from among a plurality of encoding methods.

In such a kind of system, further, an absence setting is performed and a mail can be transferred to another extension or an absence message can be displayed independent of the mail function.

However, after the mail was notified, when the user doesn't listen to the mail, the mail which is not so important is held for a long time and limited memory resources are used in vain.

Hitherto, in a telephone system which has a sound storage device and executes what is called a substitute transmission service, the recorded message is transmitted to the designated destination at the time designated by the user. Since the user cannot know the speech communication charge in advance, there is a drawback such that a feeling to save the costs is not awakened to the user and a vain cost burden is unconsciously caused.

As a case of using the substitute transmission service, it is possible to presume a case where there is some information to be informed, a case where the user is going to move to a location where he cannot call a telephone from now on, a case where it is troublesome to dial many times, or the like. The above cases are considered as reasons. As messages which are transmitted in such cases by using the substitute transmission service, in many cases, there is no need to talk to the partner in a real-time manner, it is sufficient to notify the message to the partner sometime today and the time is not so important, or the like.

Hitherto, however, there is a case where even a message which is not an emergency message and whose transmission time can be shifted is transmitted at a time of a high charge in spite of the fact that the speech communication charge will be cheap if the message is transmitted a little while later.

SUMMARY OF THE INVENTION

It is an object of the invention to effectively use resources of an audio message service apparatus.

Another object of the invention is to effectively use a memory to store an audio message.

Still another object of the invention is to prevent that the memory is occupied by audio messages of a low significance.

Further another object of the invention is to reduce a memory area which is occupied by audio message of a low significance.

Further another object of the invention is to inform the calling party of the fact that the audio message from a partner has been stored in the memory on the basis of information of the partner which was inputted for call generation.

Further another object of the invention is to save the costs which are required to transmit the audio message stored in the memory.

The above and other objects and features of the present invention will become apparent from the following detailed description and the appended claims with reference to the accompanying drawings.

BRIEF DESCRIPTION OF THE DRAWINGS

FIGS. 8A and 8B are flowcharts for explaining a flow of processes upon completion of one-minute timer by the control device in the first embodiment;

FIG. 18 is a schematic diagram showing a management format of message information in the first embodiment of the invention;

FIG. 19 is a schematic diagram showing charge systems of a plurality of telephone line companies as control targets in the first embodiment;

DETAILED DESCRIPTION OF THE PREFERRED EMBODIMENTS

Figure 1:
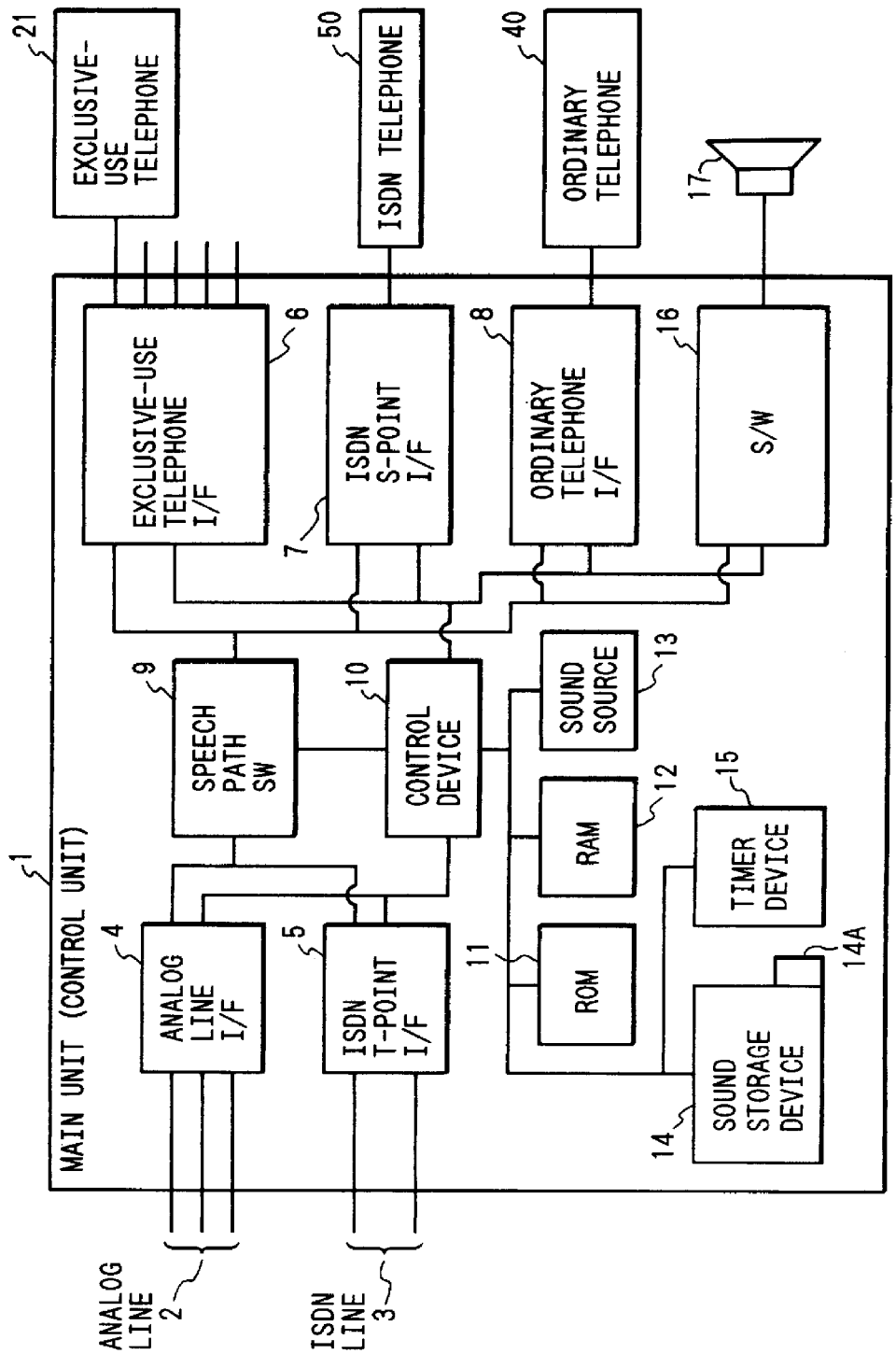
FIG. 1 is a block diagram showing a construction of the first embodiment of the invention.

FIG. 1 is a block diagram showing the first embodiment of the invention and shows a key telephone system which encloses (N) external lines and (M) extension terminals.

In the embodiment, a main unit (control unit) 1 of the key telephone system as a center of control comprises: an analog line interface 4 for transmitting dial numbers to analog lines 2 and for detecting the reception or PB signal from the analog lines 2; an ISDN T-point interface (I/F) 5 to connect the ISDN line 3; an exclusive-use telephone interface 6 to enclose an exclusive-use telephone 21 as an extension; an ISDN S-point interface 7 to connect an ISDN telephone 50; an ordinary telephone interface 8 for sending a call signal to an analog ordinary telephone 40 or a facsimile and for detecting dial pulses or a PB signal therefrom; a speech path switch 9 to switch/connect a speech path between an external line and an extension; a control device 10 comprising a microprocessor or the like for controlling the operation of the key telephone system; an ROM 11 to hold a program describing the operation of the system or the like; an RAM 12 to hold usage data of the system and set data and charge information for each terminal; a sound source 13 to generate a reservation sound, a dial sound, and a PB signal sound; a sound storage device 14 to record or reproduce a speech communication sound or a response message; a timer device 15 for measuring the time and notifying an event of the timeout to the control device 10; and a switch 16 to control a sound signal output to a load-apparatus (sound amplifying apparatus) 17 such as a speaker or the like.

The sound storage apparatus 14 has an encoding apparatus 14A for encoding a sound by either one of the encoding method of a low compression ratio and the encoding method of a high compression ratio and for storing the encoded signal.

Figure 2:
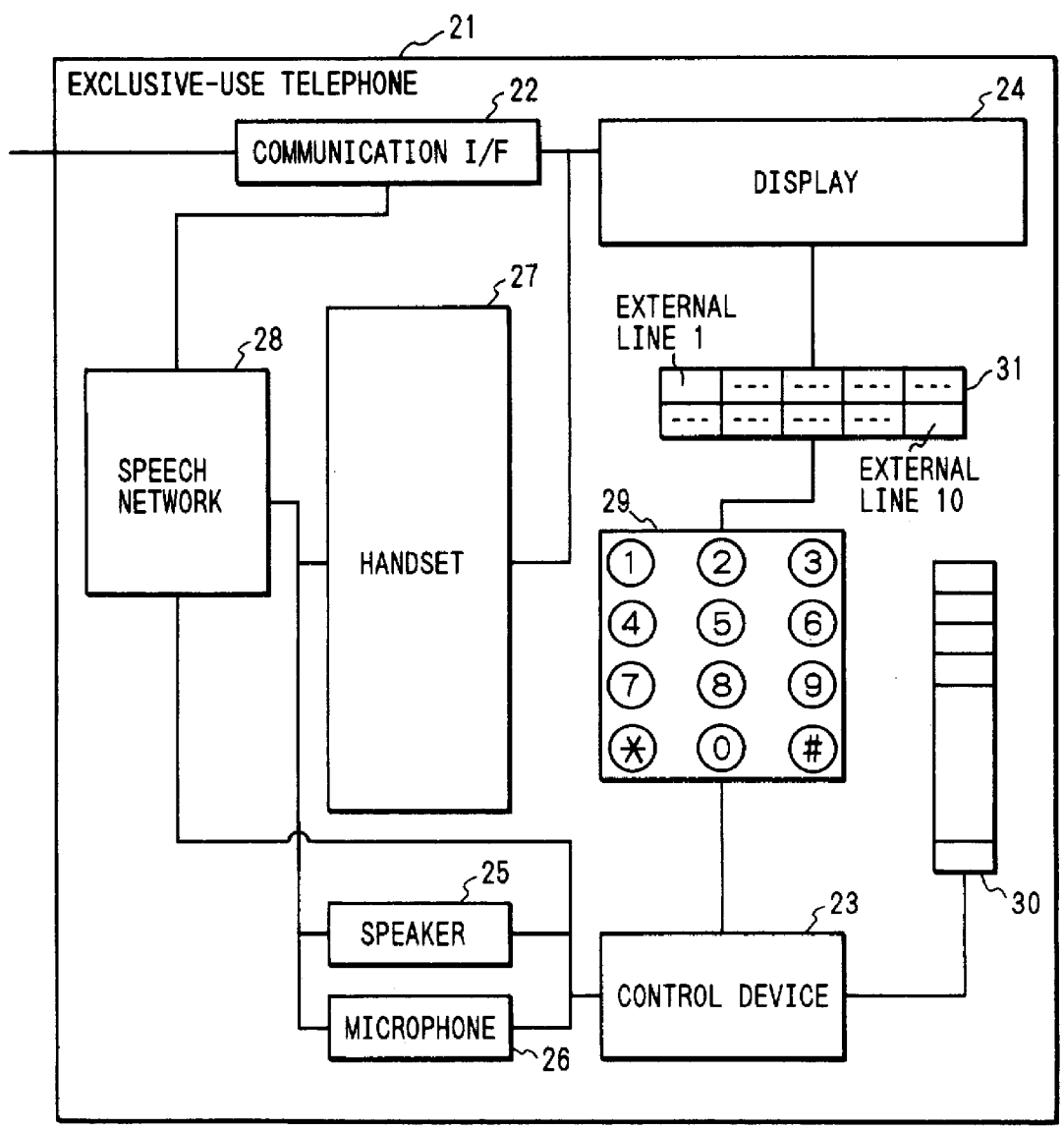
FIG. 2 is a block diagram showing a construction of an exclusive-use telephone in the first embodiment.

FIG. 2 is a block diagram showing a construction of the exclusive-use telephone 21 which is enclosed in the key telephone system.

The exclusive-use telephone 21 comprises: a communication interface (I/F) 22 to establish a control channel and an information channel between the communication I/F 22 and the main unit 1; a control device 23 to control the operation of the exclusive-use telephone 21; a display 24 to display various kinds of information such as dial numbers and the like; a speaker 25 for a loud sound reception; a microphone 26 for a hand-free speech transmission; a transceiver 27 to execute a speech communication; a speech network 28 to switch the speaker 25, microphone 26, and transceiver 27; dial buttons 29 to input dial numbers; function buttons 30 which are used at the time of the reservation or the setting of various kinds of data; and external line buttons 31 which are used for an external line capture or response.

The terms in the following description will now be defined hereinbelow.

First, "event" denotes the operation (lift-up or put-down of the handset) of the user, the reception from the external line, the timeout from the timer device 15, or the like. "state" denotes the stage in which the system waits for an event in the processing step of the control device. "idle" denotes a state in which the terminal is not used and the reception is not accepted. "off hook" denotes that a handset is lifted up from an idle state or a speaker button is depressed. "on hook" denotes that the handset is put down at the time of speech communication using the handset or the speaker button is depressed upon speech reception via a speaker. "special number operation" denotes the depression of a number other than the number for the extension/external line transmission or the depression of the buttons which are especially allocated. "terminal" denotes a general denomination of the equipment which is enclosed in the extension of the system.

Figure 3:
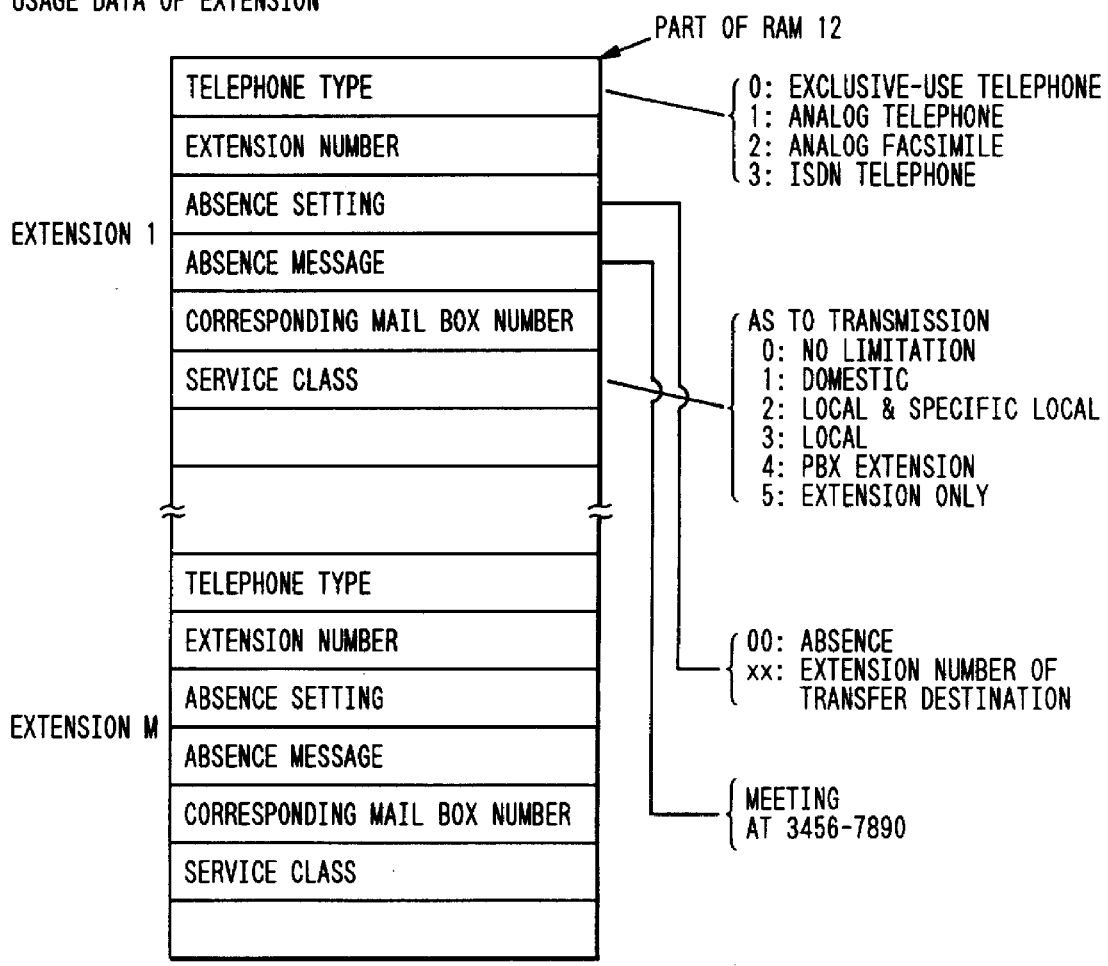
FIG. 3 is a schematic diagram showing an example of usage data of an extension in the first embodiment.

FIG. 3 is a schematic diagram showing an example of usage data of the extensions in the embodiment.

As such usage data, there are prepared: a telephone type indicative of either one of four kinds of 0 to 4; an absence setting indicative of the presence or absence of an absent state and the extension number of the transfer destination; an absence message to display the contents of the absence; a corresponding mail box number of the extension; and a service classification indicative of either one of five kinds of 0 to 5 with respect to, for example, the transmission.

Figure 4:
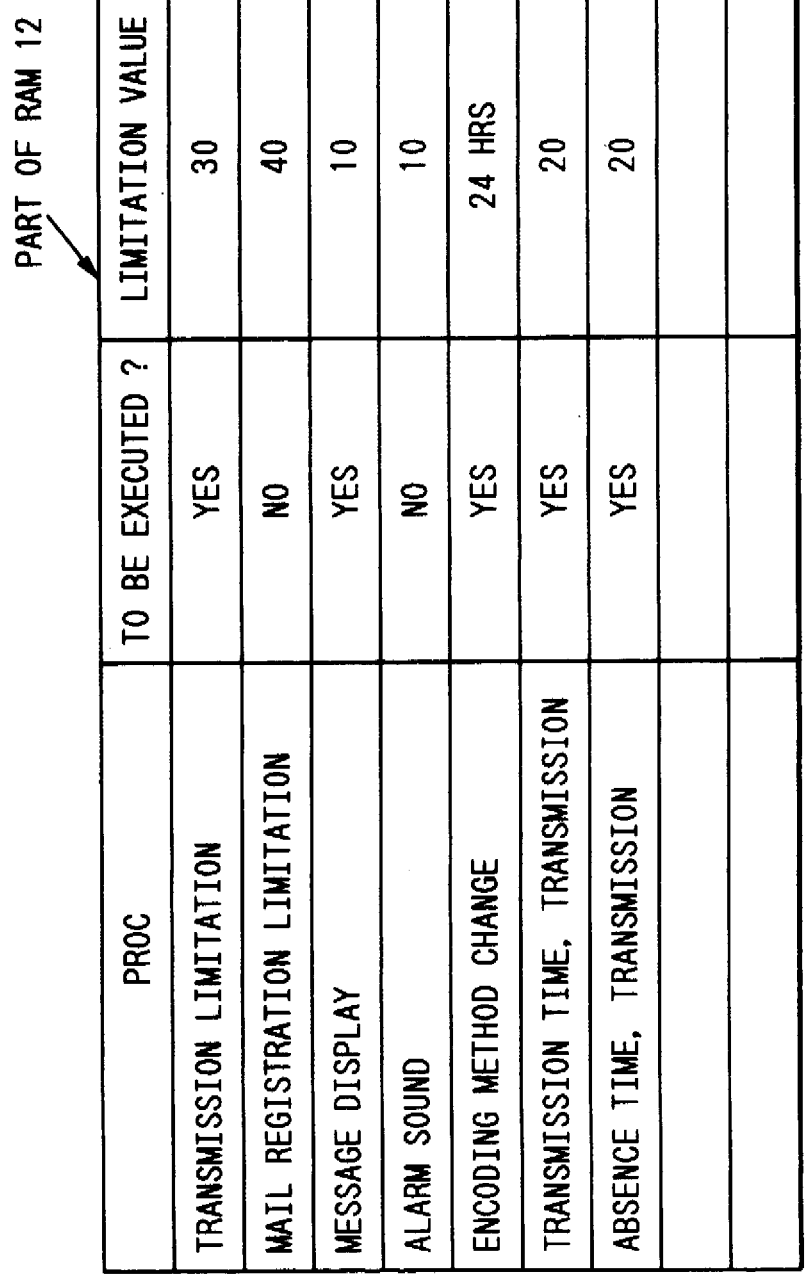
FIG. 4 is a schematic diagram showing the usage data regarding the process in the case where a mail stayed in the usage data which is common to a system in the first embodiment.

FIG. 4 is a schematic diagram showing the usage data regarding the processes in the case where mails stay among the usage data which is common to the system in the embodiment.

As shown in the diagram, information indicating whether each of the processes such as "transmission limitation", "mail registration limitation", "message display", "alarm sound", "encoding method change", "transmission time, transmission (the staying mails corresponding to the transmission terminal are sent upon transmission)", and "absence time, transmission (in the case where a call is received during the absence setting, the staying mails corresponding to the calling party terminal are sent)" is executed or not and a limitation value of the number of staying mails are set. Namely, with respect to the processes in which the result of the discrimination about "permission or inhibition" in FIG. 4 indicates the permission, at a time point when the number of staying mails is equal to or larger than the limitation value, each process is executed.

Figure 5:
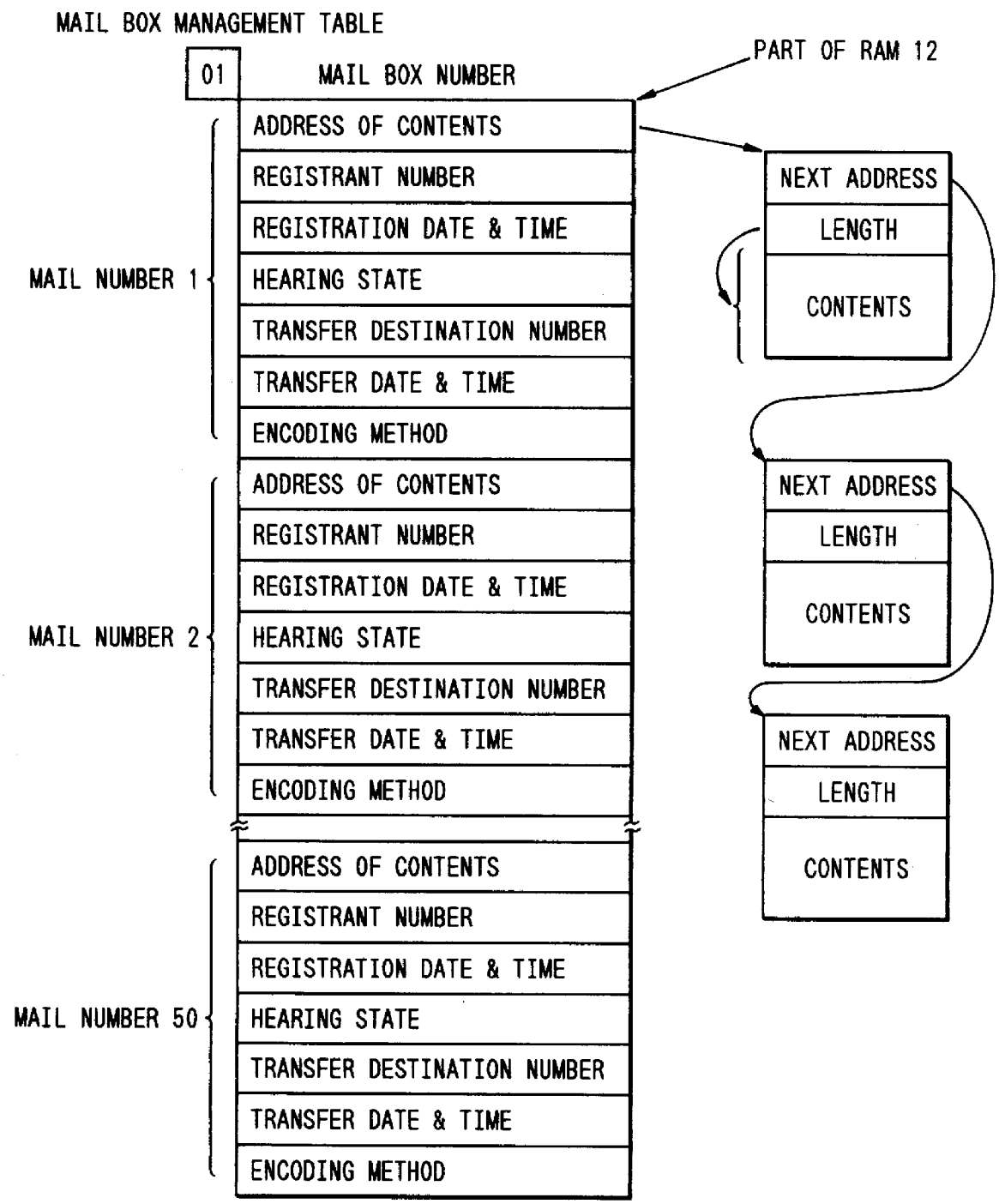
FIG. 5 is a schematic diagram showing a management table which is used in the mailing function in the first embodiment.

FIG. 5 is a schematic diagram showing a management table which is used in the mailing function of the system. The terms in each column in FIG. 5 will be first described.

"mail box" denotes a fundamental constructional element of the mailing function. Mails are posted into or read out from the "mail box". One "mail box" is ordinarily allocated to each telephone. There is another mail box for an official report or the like which is commonly used for the system.

"mail box number" denotes an identifier to unconditionally identify the mail box. "address" denotes a management address in the sound storage device 14 indicative of the area in which the message is held. "mail number" denotes information to manage for every mail box. In the system, the number (for example, 50) of mails which can be registered for one mail box can be defined. Although FIG. 5 shows the management table of the mail box of the mail box number "01", a similar management table is also provided for the mail box of another mail number.

"registration data & time" denotes the data and time at which the mail was registered. Upon hearing, they are announced as a sound prior to sending the mail. "registrant number" denotes the number of the person who registered the mail. In case of the extension, the extension number of the terminal is stored. In case of the external line to which the calling party number is informed, such a number is stored. In case of the external line to which no calling party number is notified, when the number is notified by the PB signal, such a number is stored.

"hearing state" denotes the data and time at which the mail was first heard in the case where the mail has already been heard. When nothing is heard, such a fact is shown. "transfer data and time" denotes the date and time at which the mail is automatically transferred to another terminal or external line. "encoding method" denotes 32 kbps and an ADPCM system or another system.

In the system, when the mail is registered, heard, or deleted, the management table is renewed.

FIGS. 6 to 17 are flowcharts for explaining flows of processes of the control device 10 in the embodiment.

(1) When the mail is registered to another terminal:

The occurrence of the event at the terminal in the idling state (S101 in FIG. 6) is monitored (S102). When the event indicates the special number operation of the mail registration, it is instructed for the user to input the mail box number of the destination and the number of mails held there is discriminated (S103). When it is larger than the number (50 in this case) of mails which is permitted for the system, a guidance indicating that they cannot be registered is sent (S104) and the apparatus is held in the idling state.

It is now assumed that the guidance has previously been held in the RAM 12, sound source 13, and sound storage device 14. This point is also similarly applied hereinbelow.

When the number of mails of the corresponding terminal lies within the allowable range in step S103, a check is made to see if the transmission limitation mode has been set or not (S105) on the basis of the management table expressing the usage data which is common to the system shown in FIG. 4. For example, in the case where the extension "1", requested the mail registration to the mail box of the extension "2", a check is made to see if the number of mails registered in the mail box of the extension "1" is equal to or less than the limitation value "40" or not.

When the number of mails for the operation terminal is equal to or larger than the limitation value and when the transmission limitation mode is set, a service class of the transmission is changed (for example, it is changed from "no limitation" to "extension only") in step S106.

In steps S107 and S108, a check is made to see if it is necessary to display the message or not in accordance with the number of mails and, if YES, the terminal is controlled so as to display a message to instruct the user to listen to the mail.

Similarly, in steps S109 and S110, a control is performed so as to transmit an alarm sound indicating that the mails stay.

In step S111, a check is made to see if the registration is limited or not. If the limitation is necessary, the request for the mail registration is refused and the system is set into the idling state. If the registration is not limited, the registering process is executed by using the encoding method of a low compression ratio in step S112.

(2) When a message service is registered:

In the following description, message information such as message ID, telephone number of a message destination, transmission date and time, transmission time, and the like has been held in a format shown in FIG. 18.

"message service" denotes a function to transmit the messages registered in the sound storage device to the designated terminal at the set time.

Figure 7:
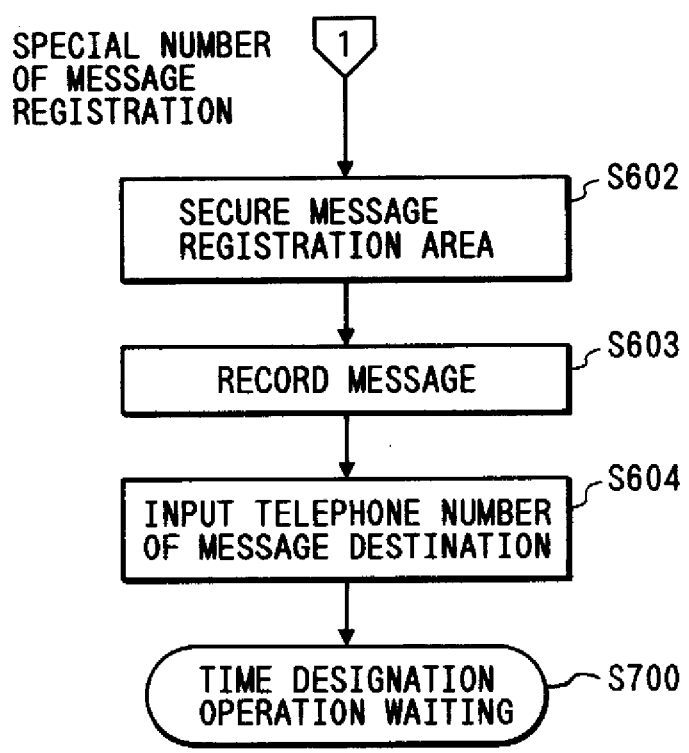
FIG. 7 is a flowchart for explaining a flow of processes upon message registration by the control device in the first embodiment.

The control device 10 secures a message registration area which is necessary for registration in the sound storage device 14 (S602 in FIG. 7). The message ID is given to the secured area and is used for management. After that, a guidance to instruct the user to generate an event is displayed and the sound recording operation is started (S603). The time is measured.

After completion of the recording, the telephone number of the partner to which the message is informed is inputted and is held into the RAM 12 as message information together with the recording time (S604). The operating mode of the system is shifted to the time designation operation waiting mode (S700).

Figure 15:
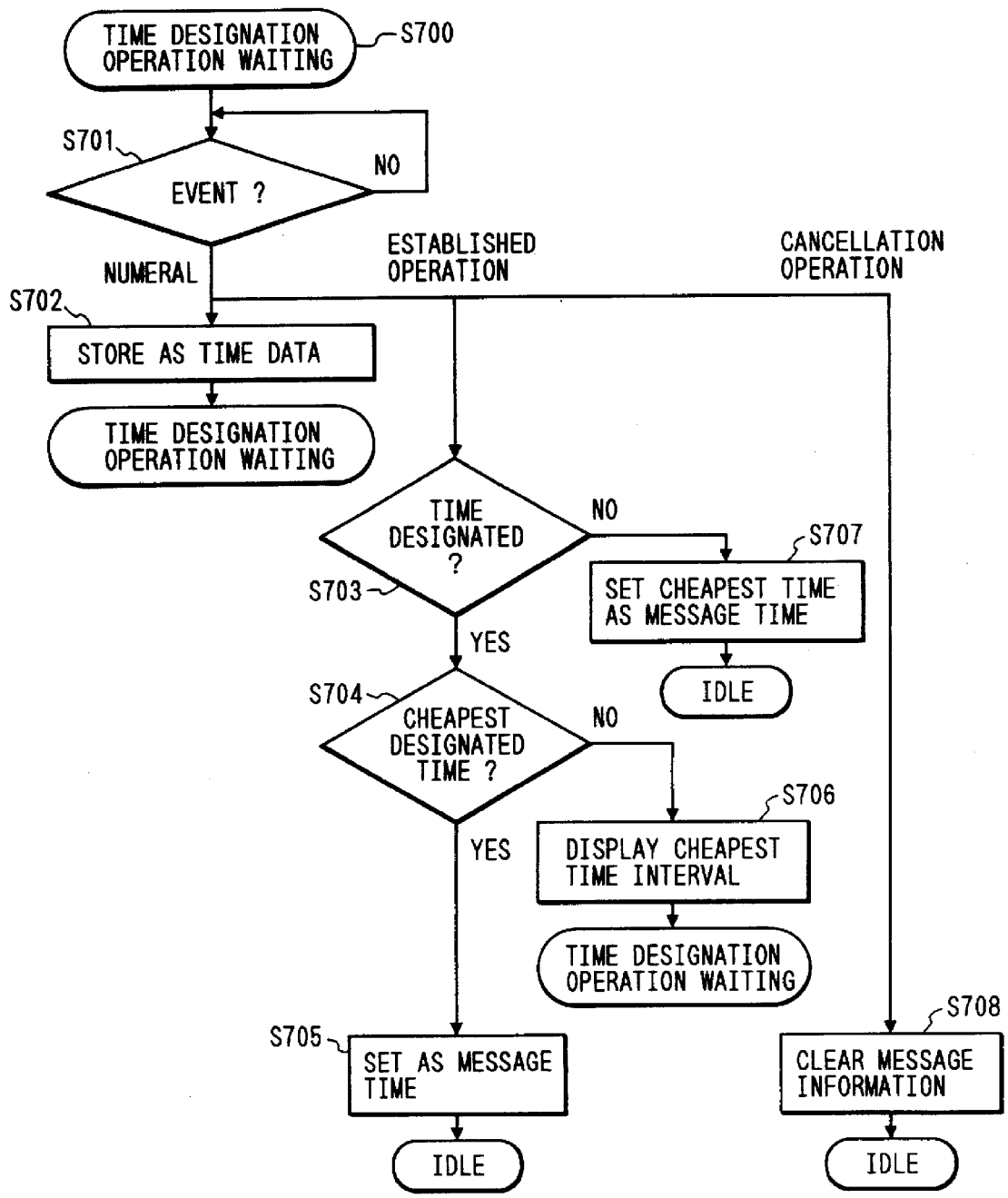
FIG. 15 is a flowchart for explaining a flow of processes upon time designation operation waiting by the control device in the first embodiment.

Even in the time designation operation waiting mode (S700), the event generation of the event is monitored (S701 in FIG. 15). When the user inputs the dial buttons by numerals, they are held (S702) and the system waits for the next operation.

In step S701, when the operation of the user is an established operation, a check is made to see if numerical values of four digits have been inputted or not (S703). When the numerical values are correctly inputted, they are recognized as a time and the speech communication charge at that time and the speech communication charge of the time zone near such a time point are calculated and compared (S704). When the charge at the designated time is cheapest, such a time is set as a message time (S705) and the system is set into the idling state. When there is a time zone cheaper than the designated time, a message indicative of such a fact is displayed on the telephone and is informed to the user (S706). The system waits for the correction/established operation of the user.

When numerical values of four digits are not inputted in step S703, the cheapest time is set as a message time as an automatic setting by the system (S707). The system is returned into the idling state.

When a cancellation operation is executed in step S701, the message information is cleared (S708) and the system is returned to the idling state.

Figure 6:
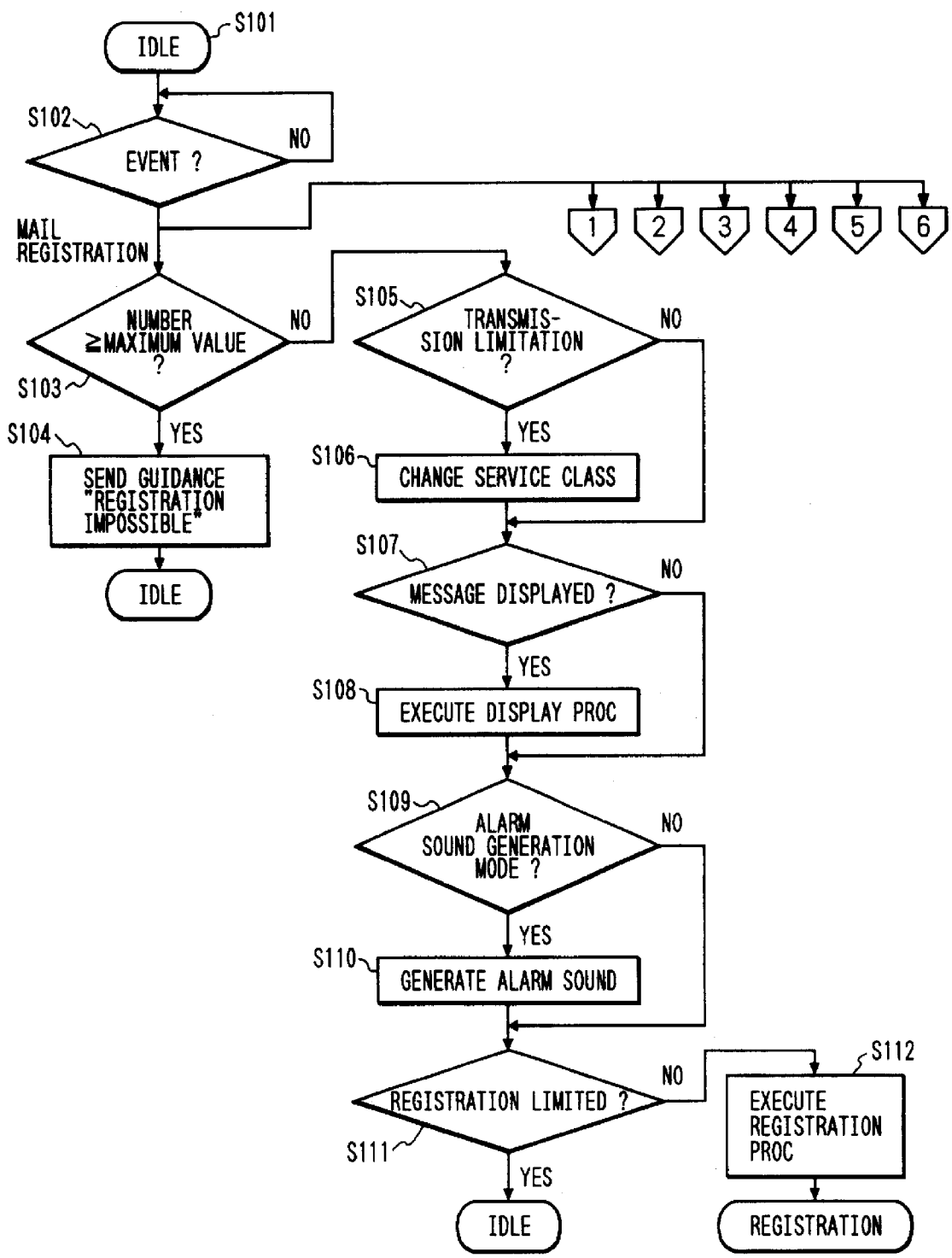
FIG. 6 is a flowchart for explaining a flow of processes upon mail registration by a control device in the first embodiment.
Figure 8A:
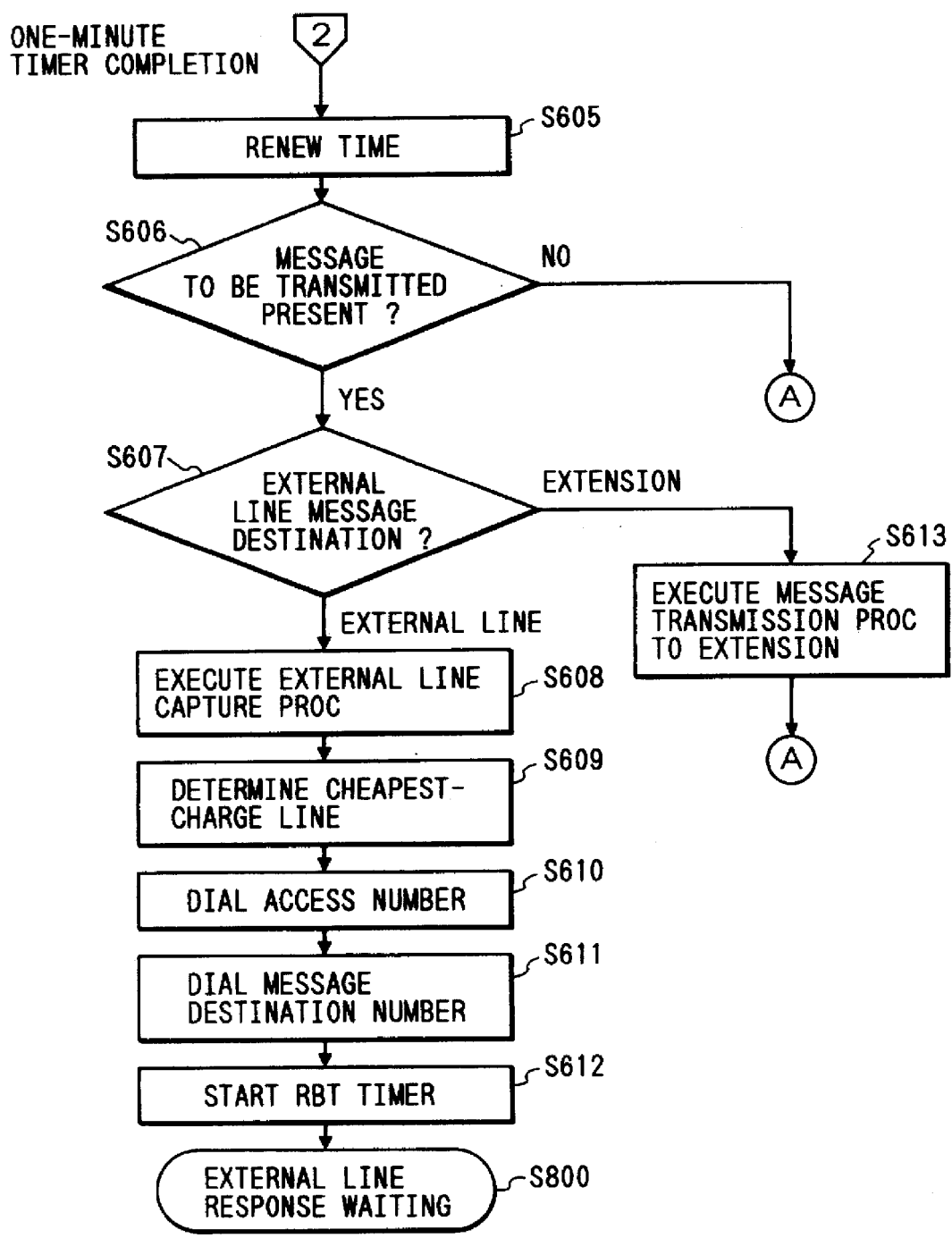

(3) Upon completion of one-minute timer:

When the one-minute timer times out for the event in step S102 in FIG. 6, the time display of the telephone is renewed (S605 in FIG. 8A). A one-minute completion event has been preset so that the timer device 15 notifies such an event for every one-minute interval. Subsequently, the message information in FIG. 18 is retrieved and a check is made to see if the time which coincides with the present time exists in the transmission times or not (S606).

If YES, a check is made to see if the message destination is an external line or not (S607). If YES, a free external line is captured (S608). The line of the cheapest speech communication charge is determined (S609). The access number to such a line is dialed (S610). The message destination numbers are subsequently dialed (S611). When all of the dial numbers are sent, an RBT time timer to judge that the partner doesn't respond is activated (S612). The system is set into an external line response waiting mode.

Figure 16:
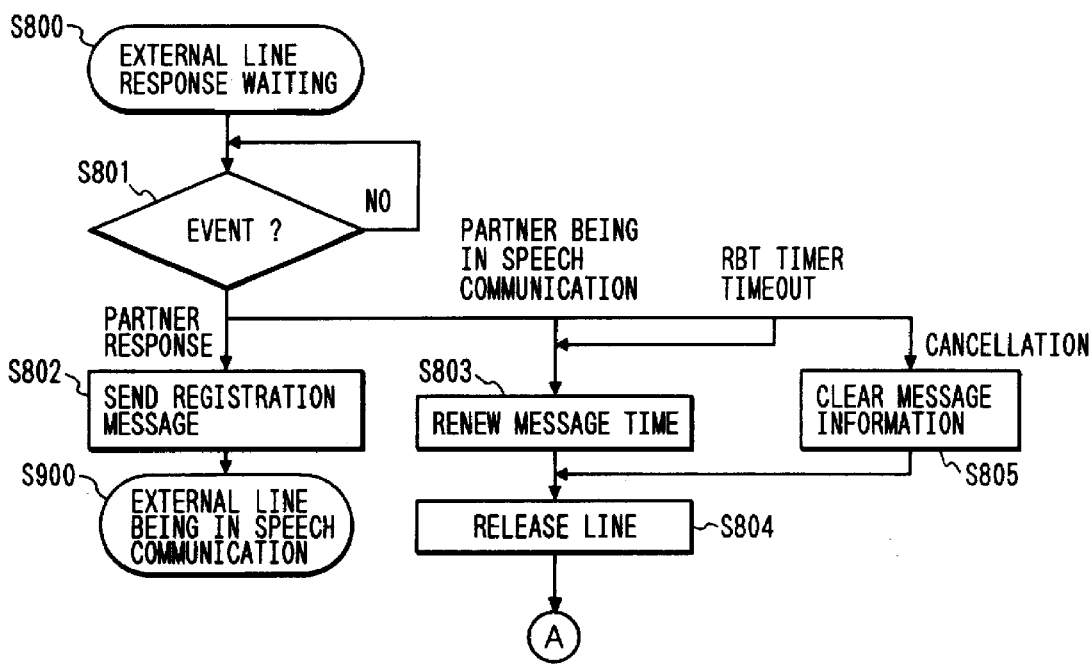
FIG. 16 is a flowchart for explaining a flow of processes upon external line response waiting by the control device in the first embodiment.

In the external line response waiting mode (S800), the occurrence of the event is monitored (S801 in FIG. 16). When the response of the partner is detected by the polarity inversion of the line, the stop of the RBT, or the like, the corresponding registration message is sent (S802). The system enters the external line in-communication state (S900).

In step S801, when the event is in the partner's speech communication or the RBT time timer times out, the message time is changed (S803). "RBT" denotes a ring backtone, namely, a calling sound and is a sound to inform the calling party of the fact that a call signal has been transmitted. Although the change time is set to a value in which a predetermined time is added to the value so far, since it is desirable to transmit in the cheap time zone as much as possible, the change time is set so as to frequently transmit the message as the speech communication charge is cheap as much as possible. As shown in FIG. 19, as for the speech communication charge, "speech communication time charge" data of a plurality of telephone line companies (A, B, C, D) has been provided in the RAM 12 in correspondence to the ground numbers (station numbers necessary when the charges are obtained from the time difference method for each distance. Such a data is renewed each time the charge system of each line is changed.

When the message time is renewed as mentioned above, a disconnection processing is executed to the external line (S804).

Even in the state in step S800, the cancellation processing is effective (S805).

Figure 17:
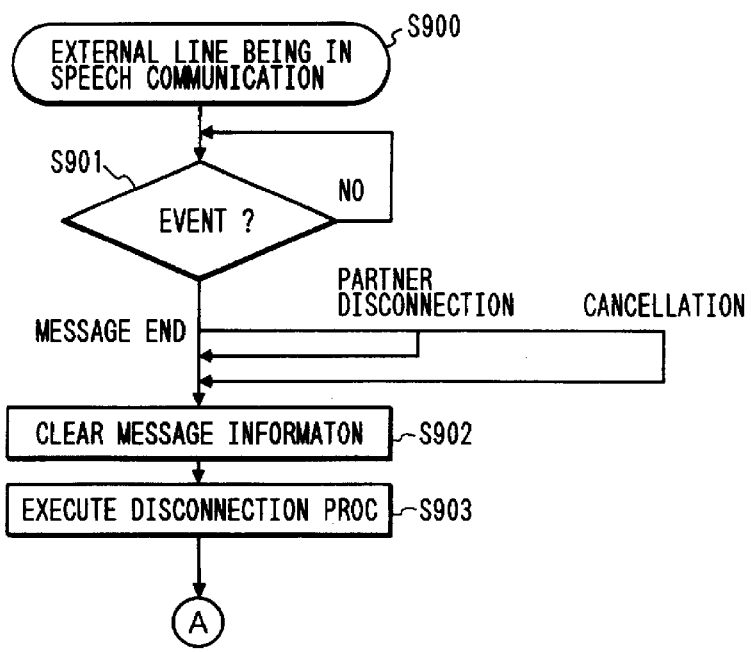
FIG. 17 is a flowchart for explaining a flow of processes during external line speech communication by the control device in the first embodiment.

Even during the external speech communication (S900), the event is also monitored (S901 in FIG. 17). The message information is cleared by the notification of the end from the sound storage device 14, detection of the disconnection of the partner, or the cancellation operation (S902). The speech communication is disconnected (S903).

A check is made to see if it is necessary to change the encoding method or not in step S121 in FIG. 8B on the basis of the management table.

When it is necessary to change the encoding method, in steps S122 to S129, the holding periods are calculated from the registration dates and times with respect to all of the mails in all of the mail boxes in FIG. 3 and checks are made to see if they are equal to or larger than limitation values of the system usage data or not. If YES, a part of the sound storage device 14 is used as an operation area and is again registered as a mail by using the encoding method of a higher compression ratio. After all of the processes of the reselection registration, other processes such as renewal of the date and time display and the like are executed (S130).

In the case where the number of mails has been set as a limitation value, the mails which have already been registered is again compressed at the time of mail registration in step S112.

Figure 9:
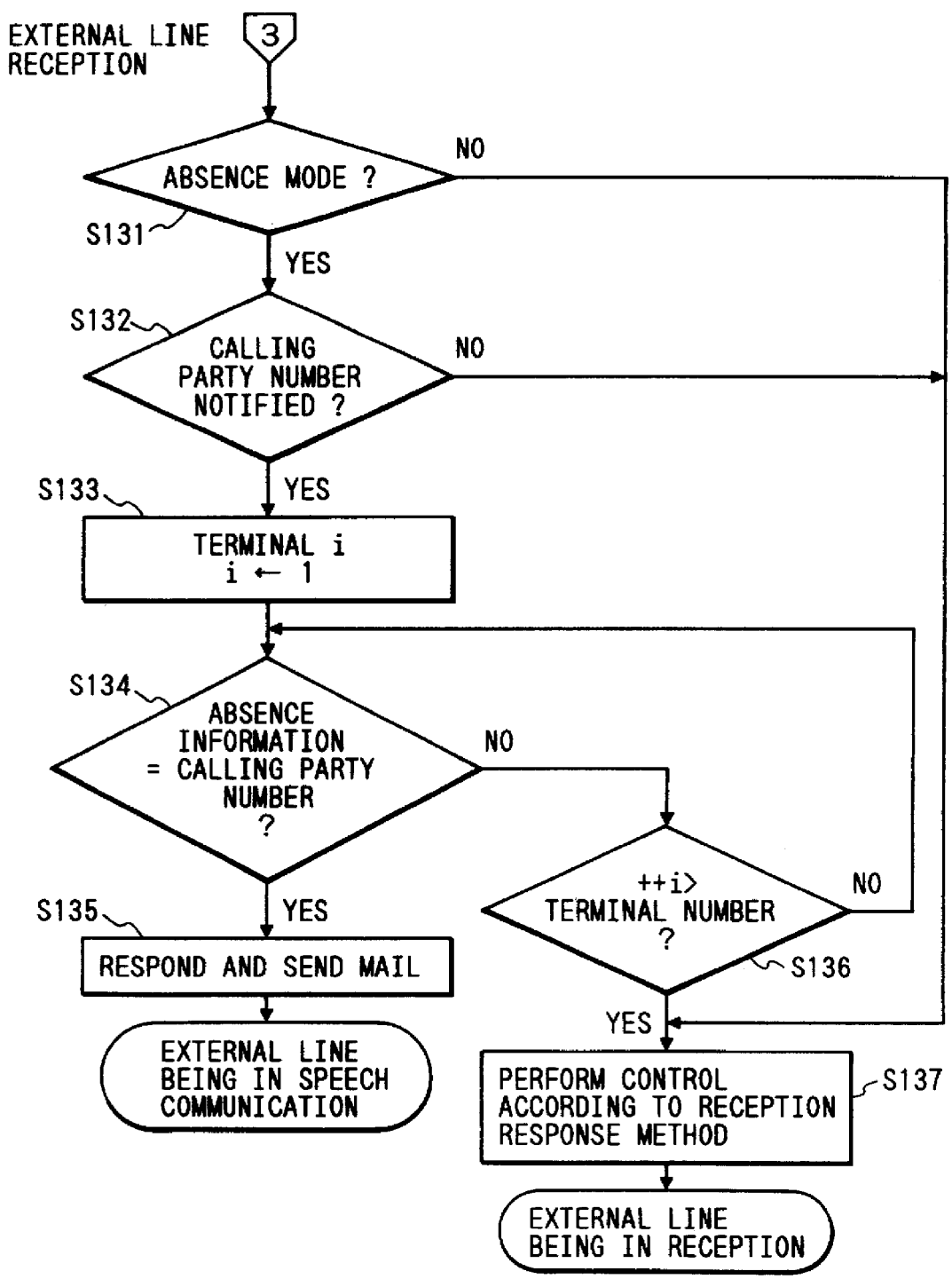
FIG. 9 is a flowchart for explaining a flow of processes upon external line reception by the control device in the first embodiment.

(4) In the case where there is a reception from the external line in which the calling party number is known and the mail of the same registration number as the calling party number exists:

In the case where the event indicates the external line reception in step S102 in FIG. 6, a check is made to see if the operating mode is the mail transmission mode or not in accordance with a situation of the absence setting (S131 in FIG. 9). In case of transmitting the mail, a check is made to see if the calling party number exists in the reception call information from the external line or not (S132). When the calling party number is known, a check is made to see if the external line number such as a communication partner or the like exists in the absence message in FIG. 3 or not with respect to all of the terminals. Such a discrimination is made by judging whether the set number coincides with the calling party number or not (S134). When they coincide, since there is a high possibility such that the communication is a communication from the user who made the absence setting, the system responds to the reception. The corresponding mail is sent to the absence setting terminal (S135). In this instance, since it is also considered that there is a reception from a person other than the absence setting user, a personal identification number is sent prior to the mail transmission.

When the absence message which coincides with the calling party number doesn't exist in all of the mails, a control such as ringing of a reception sound or display is executed in accordance with a predetermined reception responding system (S137).

Figure 10:
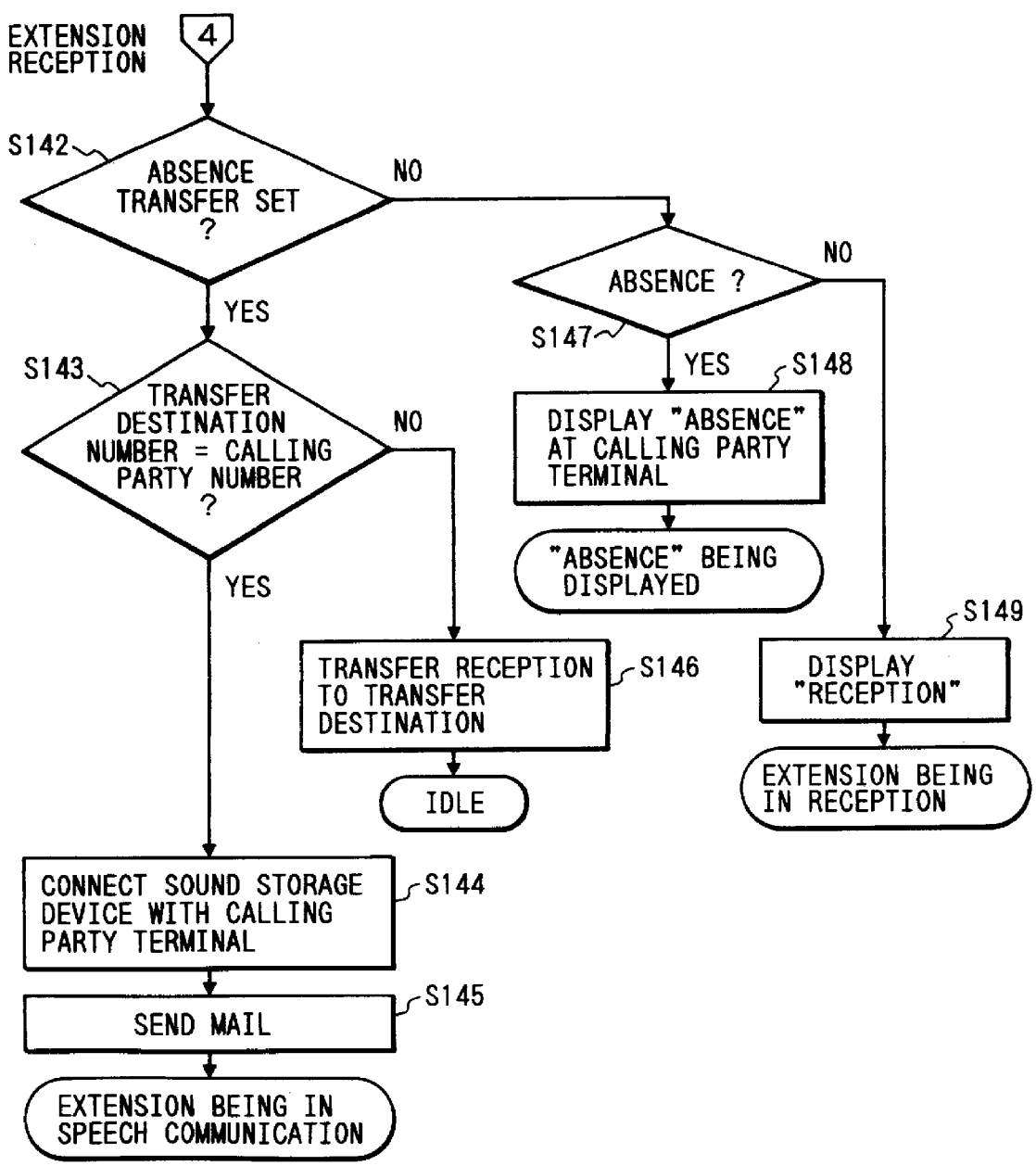
FIG. 10 is a flowchart for explaining a flow of processes upon extension reception by the control device in the first embodiment.
Figure 11:
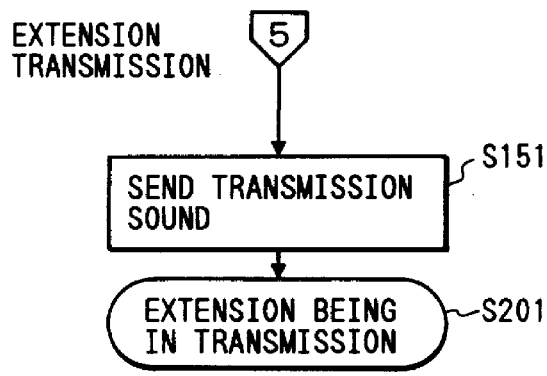
FIG. 11 is a flowchart for explaining a flow of processes upon extension transmission by the control device in the first embodiment.
Figure 12:
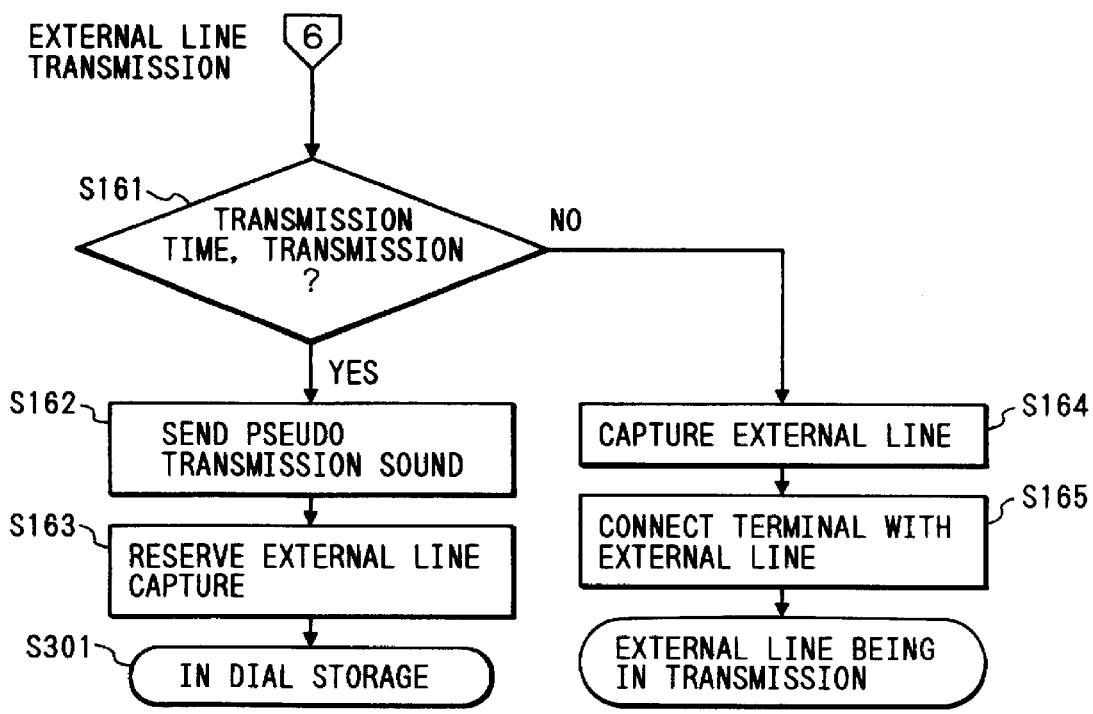
FIG. 12 is a flowchart for explaining a flow of processes upon external line transmission by the control device in the first embodiment.

(5) In the case where the terminal in which the absence transfer has been set is accessed from the extension:

When the event indicates the extension reception in step S102 in FIG. 6, in steps S142 to S145 in FIG. 10, when the calling party terminal coincides with the transfer destination in the absence transfer mode, the sound storage device 14 is connected to the calling party terminal and the mail is sent.

When the numbers don't coincide in the absence mode, a reception is sent to a predetermined transfer destination (S146). When the terminal is set to an operating mode other than the absence transfer, an absence display or a reception display is executed (S147 to S149).

In step S135 in FIG. 9 or in step S145 in FIG. 10, a tone signal indicative of the presence of the mail can be also transmitted instead of sending the mail.

(6) When the extension call is performed:

When the event denotes the extension transmission in step S102 in FIG. 6, a transmission sound is transmitted to such a terminal (S151 in FIG. 11), thereby setting the state into a state during the extension transmission (S201).

Figure 13A:
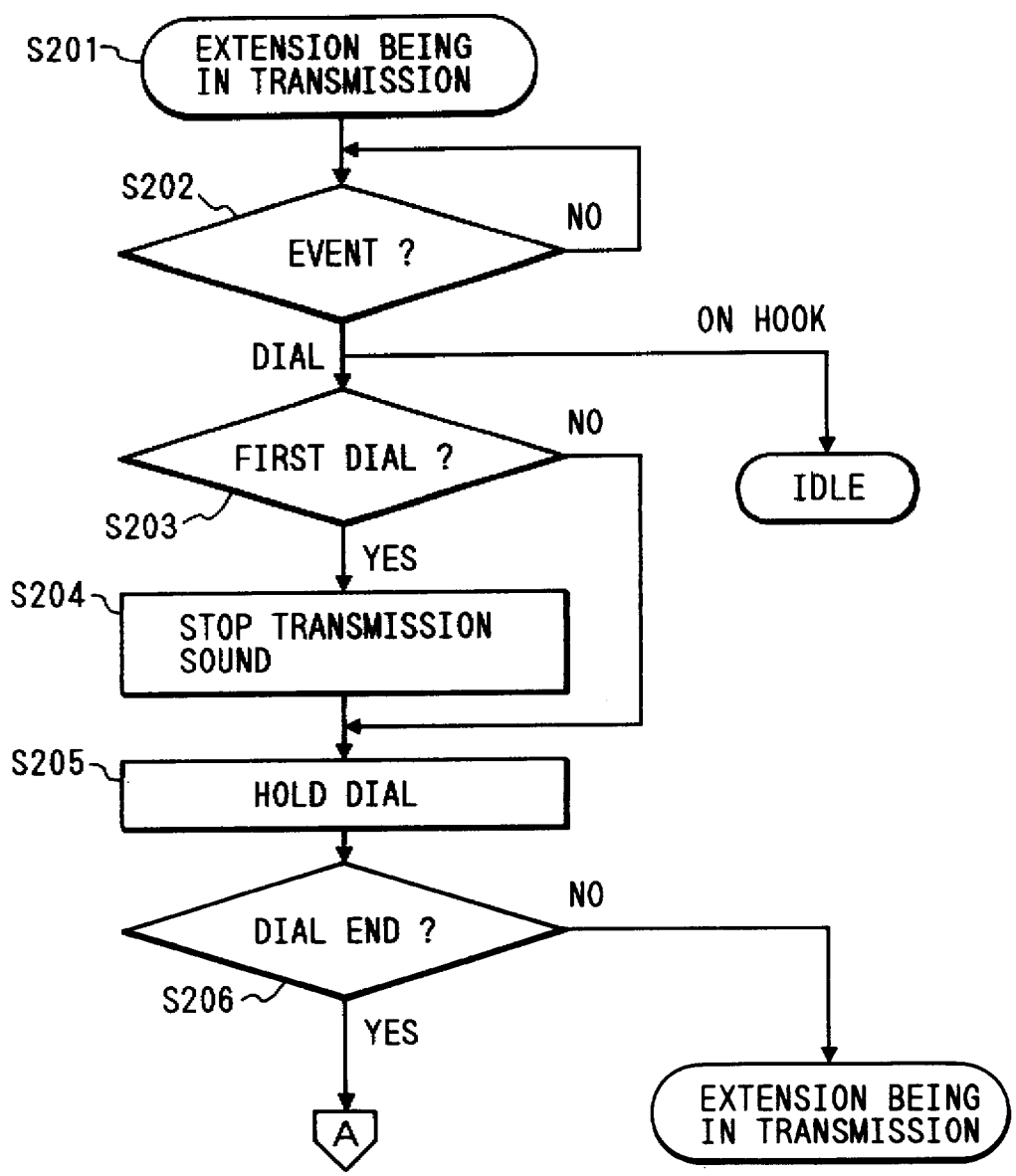
FIGS. 13A and 13B are flowcharts for explaining a flow of processes during extension transmission by the control device in the first embodiment.

Event is monitored in the state in which the extension is in transmission (S202 in FIG. 13A). When the event denotes the dial and the first dial, the transmission sound is stopped (S203, S204). The dial numbers are subsequently held (S205). The dial end is discriminated by the number of digits of the numbers held (S206). When there is a remaining dial number, the system waits for the next event in the extension transmission.

Figure 13B:
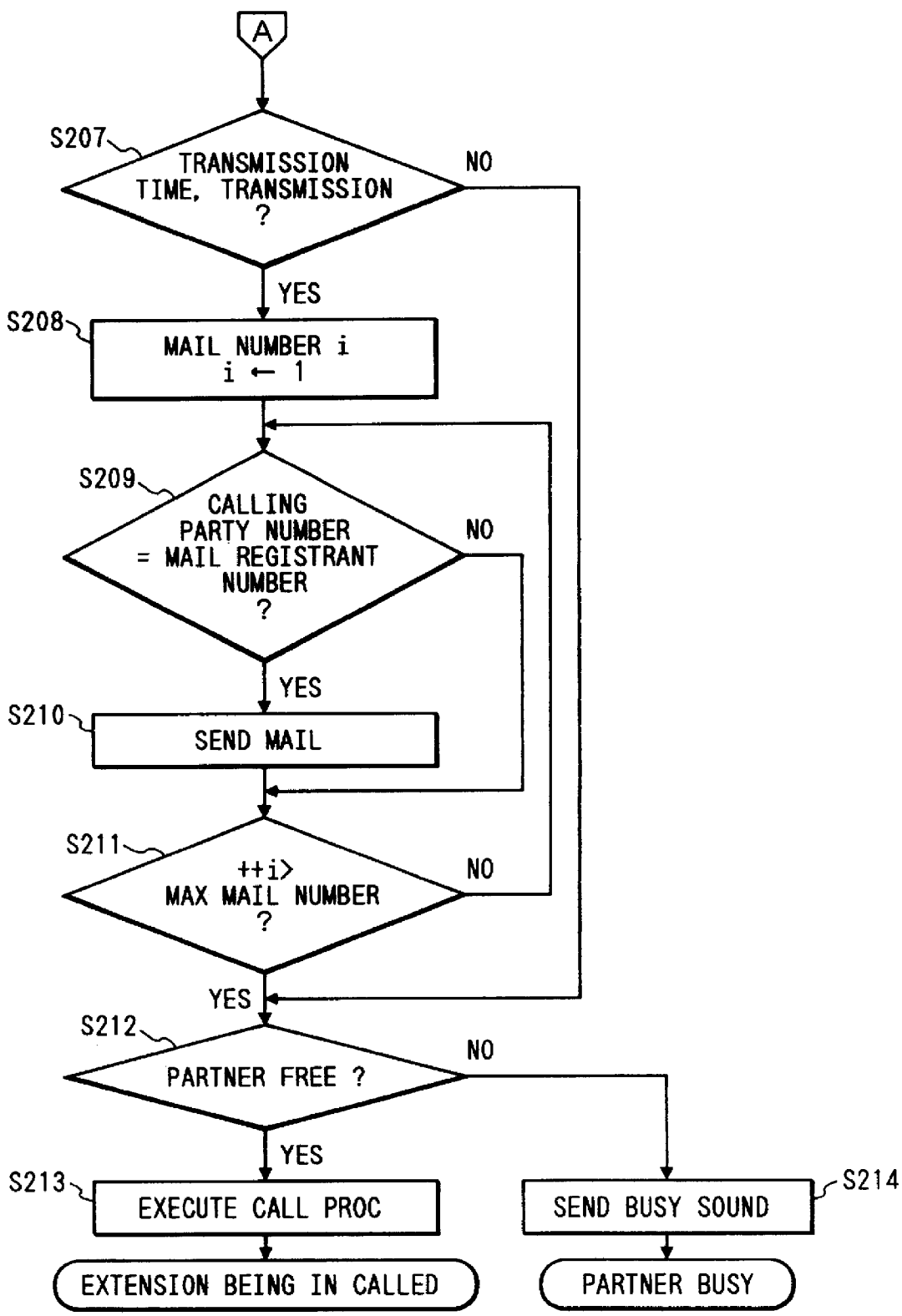

When the dial end is detected in step S206, a check is made to see if the mode to transmit the mail at the time of transmission has been set or not (S207 in FIG. 13B). When the registration number of the mail is the same as the calling party dial number, the mail is transmitted (S208 to S211).

After the mail was sent, a calling process or a transmitting process of a busy tone is newly executed (S212 to S214).

(7) When a call is generated to the external line in which the mail was registered:

When the event indicates the external line transmission in step S102 in FIG. 6, so long as the mail transmitting mode has been set (S161 in FIG. 12), a pseudo transmission sound is transmitted (S162) in consideration of the case of sending the mail before the external line call is generated. A capture reservation is performed (S163) so that the external line is not used by another person. Actually, the operating mode is shifted to the mode in dial storage without capturing the external line (S301).

When the mail transmitting mode is not set, the external line is captured and is connected to the terminal (S164, S165).

Figure 14:
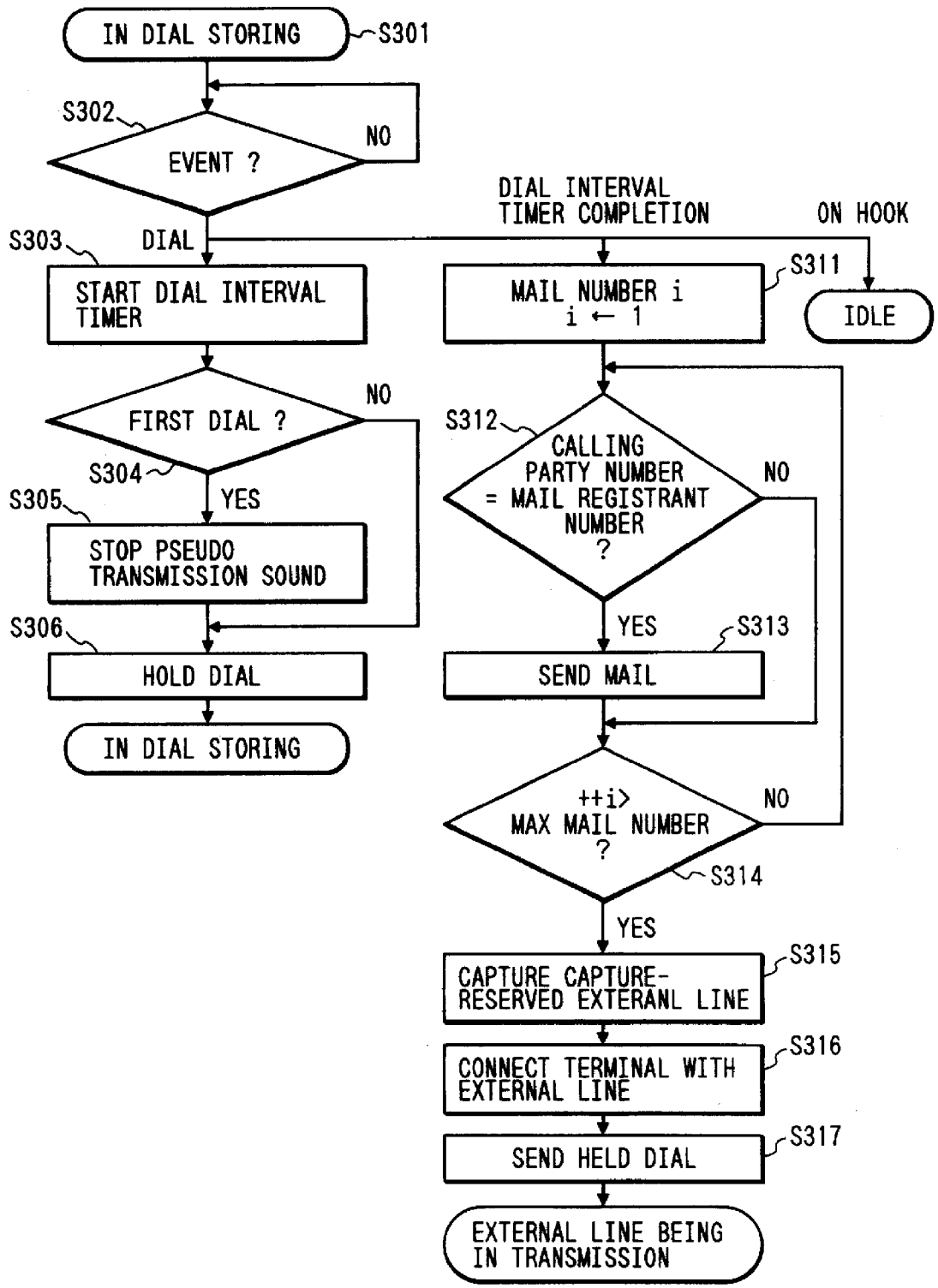
FIG. 14 is a flowchart for explaining a flow of processes during dial storage by the control device in the first embodiment.

The event is monitored even during the dial storage (S302 in FIG. 14). When the event indicates the dial, the operation of a dial interval timer is started (S303). In case of the first dial, the pseudo transmission sound is stopped (S304, S305). The dial numbers are held (S306).

The dial numbers are successively stored. After the operator inputted the final dial number, a dial interval timer completion event is soon generated in step S302. Subsequently, the dial numbers which were stored so far and the registrant numbers of the mails are compared. When there is the mail of the coincident number, such a mail is sent to the operation terminal (S311 to S314).

After the mail was transmitted, the external line whose capture was reserved is captured (S315). The operation terminal is connected to the external line (S316). The stored dial numbers are sent to the external line (S317).

In step S210 in FIG. 13B and in step S313 in FIG. 14, a tone signal indicative of the presence of the mail can be also transmitted instead of transmitting the mail.

In the above first embodiment, various modifications are further possible. For example, in case of a network such that the calling party number is not notified in step S132, after the state during the external line speech communication was obtained, a guidance can be also generated so as to transmit the numbers by the PB signal. In this instance, the number is detected by a PB signal receiver which the system has, and when the number coincides with the registrant number, the mail is transmitted.

In the first embodiment, the mail which is not yet listened has been used as a target that is compared with the limitation value in the usage data table shown in FIG. 4. However, the registered mail can be also merely used as a target irrespective of the result of the discrimination regarding whether the mail has been listened or not.

In the first embodiment, further, the numbers or holding period has been considered as a limitation value shown in FIG. 4. However, a residual capacity of a capacity which can be allocated to each mail box or a remaining capacity of the whole system can be also used as such a limitation value.

The sound storage device 14 can be also provided as an external device and can be also commonly used by other systems. In this case, means for interfacing with the sound storage device is newly provided. The above function can be also realized by a sole telephone instead of an exchange apparatus such as a key telephone system.

Figure 20:
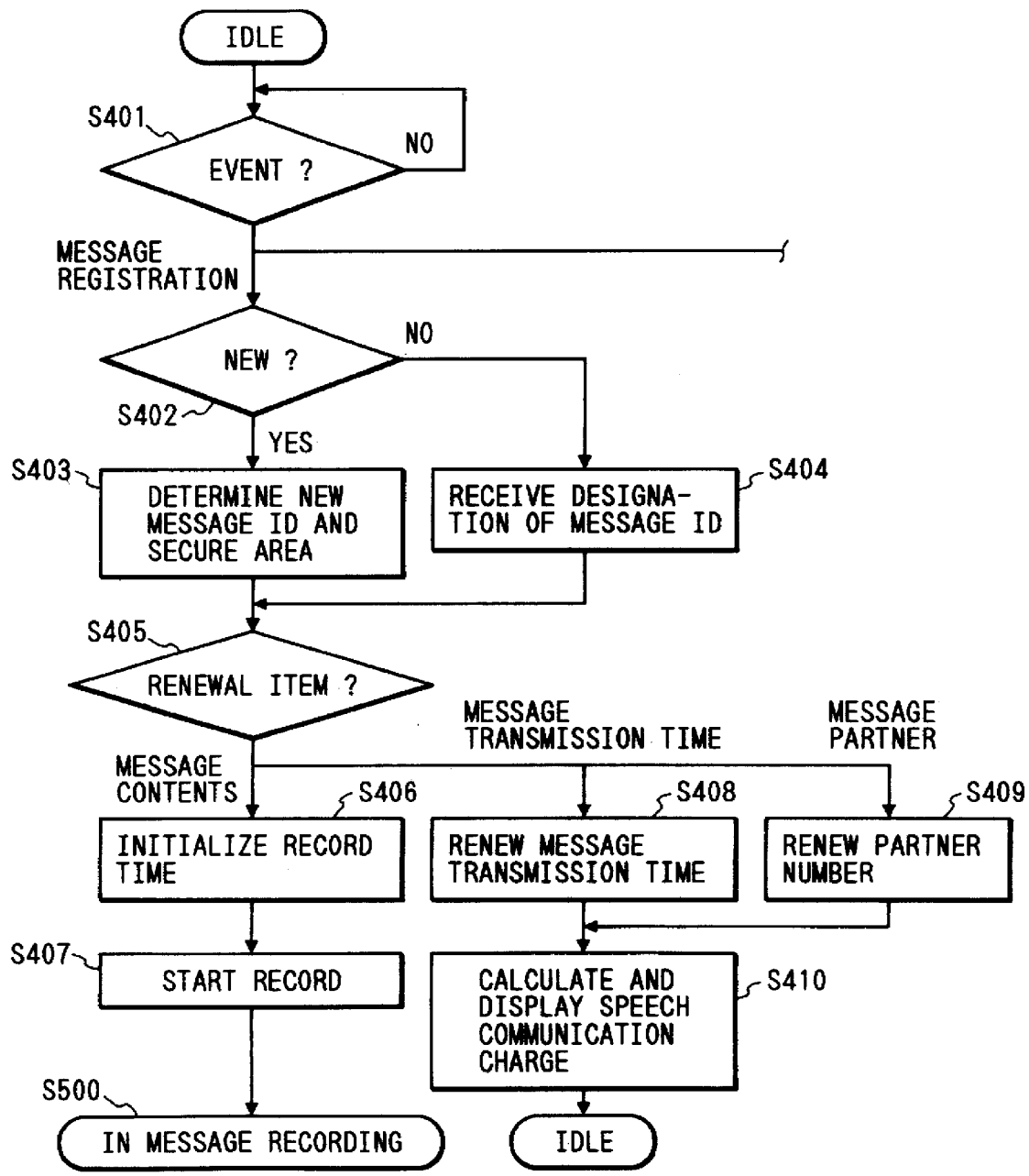
FIG. 20 is a flowchart for explaining a flow of processes upon message registration by a control device in the second embodiment.
Figure 21:
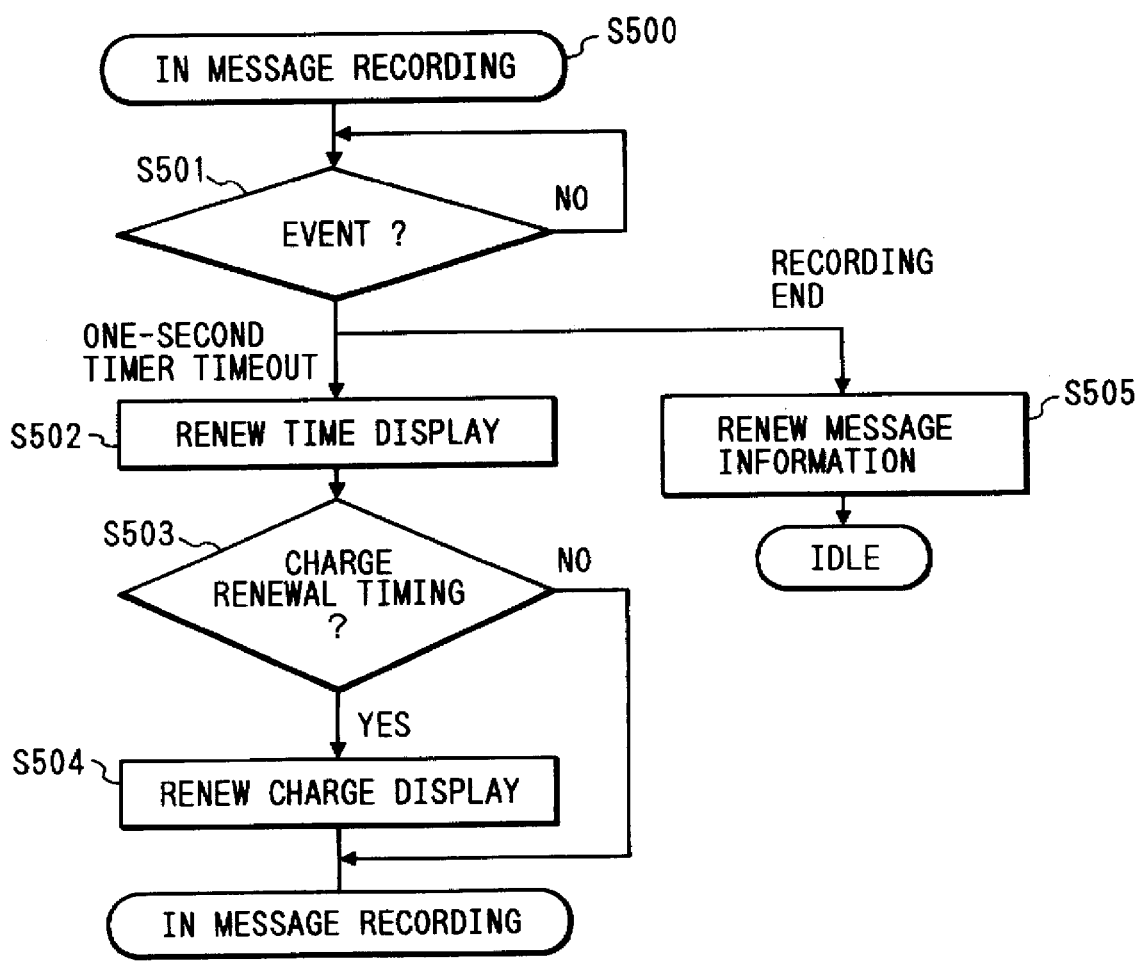
FIG. 21 is a flowchart for explaining a flow of processes during message registration by the control device in the second embodiment.

FIGS. 20 and 21 are flowcharts showing the operation in the second embodiment.

The control device 10 monitors the state of each terminal and always waits for an event (S401). The user of the terminal in the idling state depresses the special number in order to execute the message service. When the next operation (S402) indicates the new registration of a message, a message ID is newly decided and a message information area as shown in FIG. 18 is secured (S403). The processing routine advances to step S405. When the next operation indicates the correction of the existing message in step S402, the designation of the ID is received (S404) and step S405 follows.

In the embodiment, the transmission date and time are inputted from the function buttons 30 and dial buttons 29 before the message is recorded.

As instruction is made for the user to designate the renewal item in step S405. When the message content is designated, the recording time is initialized and the time is measured (S406). The recording operation is started from the transceiver 27 (S407). The system is set into the state in the message recording (S500).

In step S405, the transmission time is renewed (S408) and the message partner is renewed (S409) in correspondence to the renewal item, respectively. The speech communication charge is calculated and displayed on the telephone 21 of the user (S410).

Even in the state during the message recording (S500), the generation of the event is monitored (S501). When the one-second timer times out, the recording time displayed on the telephone 21 is renewed (S502).

In this instance, a check is made to see if the timing to renew the speech communication charge is renewed has come or not from the data in FIG. 19 (S503). If YES, the charge displayed is renewed (S504) and the recording is continued.

When the event indicates the recording end operation in the message recording state, the telephone 21 is disconnected from the sound storage device 14 and the message time or the like is renewed (S505). The system is returned to the idling state.

In the above second embodiment, further various modifications are possible. For example, the sound storage device 14 can be provided as an external device and can be also commonly used by other systems. In this case, a circuit to interface with the sound storage device is newly provided. The speech communication charge can be also expressed by an audible sound instead of displaying as a visual message. A sound indicative of the speech communication charge can be also generated from the speaker 25 of the telephone in correspondence to one degree. Further, the present function can be also realized by a sole telephone instead of the exchange apparatus such as a key telephone system.

Although the present invention has been described above, the invention is not limited to the foregoing embodiments but many modifications and variations are possible within the spirit and scope of the appended claims of the invention.

What is claimed is:

1. An audio message service apparatus comprising:

first input means for inputting an audio message;

memory means for storing the audio message inputted by said first input means;

transmitting means for transmitting the audio message stored in said memory means;

second input means for inputting a transmission time to transmit the audio message by said transmitting means, the transmission time being different from an input time when the audio message is inputted by said first input means; and display means for displaying a charge which will be required for a transmission by said transmitting means at the transmission time inputted from the second input means, during the input of the audio message by said first input means, wherein said display means displays the charge changed according to continuation of the input of the audio message by said first input means.

2. An audio message service method comprising the steps of:

inputting an audio message;

storing the audio message inputted in said audio message inputting step, into a memory;

transmitting the audio message stored in said audio message storing step;

inputting a transmission time to transmit the audio message in said transmitting step, the transmission time being different from an input time when the audio message is inputted in said audio message inputting step; and displaying a charge which will be required for a transmission in said transmitting step at the transmission time inputted in said transmission time inputting step, during the input of the audio message in said audio message inputting step, wherein the charge displayed in said displaying step is changed according to continuation of the input of the audio message in said audio message inputting step.

3. A method according to claim 2, wherein the charge is outputted to a display.

* * * * *

UNITED STATES PATENT AND TRADEMARK OFFICE
CERTIFICATE OF CORRECTION

PATENT NO. : 5,805,671
DATED : September 8, 1998
INVENTOR(S) : Masatomo Ohuchi

It is certified that error appears in the above-identified patent and that said Letters Patent is hereby corrected as shown below:

On the Cover Page, Under "Foreign Patent Documents", please delete U.K. Pat. No. 2180123 and insert therefore -- U.K. Pat. No. 2180122 --

Signed and Sealed this

Twenty-sixth Day of January, 1999

Attest:

Attesting Officer

*Acting Commissioner of Patents and Trademarks*